United States Patent [19]

Krude et al.

[11] 4,262,498

[45] Apr. 21, 1981

[54] SEALING ARRANGEMENT FOR A UNIVERSAL JOINT

[75] Inventors: Werner Krude, Neunkirchen; Karl-Heinz Müller, Wissen, both of Fed. Rep. of Germany

[73] Assignee: Uni-Cardan AG, Siegburg, Fed. Rep. of Germany

[21] Appl. No.: 20,023

[22] Filed: Mar. 13, 1979

[30] Foreign Application Priority Data

Mar. 14, 1978 [DE] Fed. Rep. of Germany ....... 2810942

[51] Int. Cl.³ .............................................. F16D 3/30
[52] U.S. Cl. ...................................... 64/21; 64/17 R; 64/32 F
[58] Field of Search ............................ 64/21, 17, 32 F

[56] References Cited

U.S. PATENT DOCUMENTS

| | | | |
|---|---|---|---|
| 830,203 | 9/1906 | Bogart | 64/32 F |
| 1,175,880 | 3/1916 | Cookingham et al. | 64/32 F |
| 2,255,172 | 9/1941 | Johnson | 64/32 F |
| 2,331,982 | 10/1943 | Johnson | 64/32 F |
| 2,547,734 | 8/1951 | Barager | 64/32 F |
| 3,296,833 | 1/1967 | McCarthy | 64/21 |
| 3,798,927 | 3/1974 | Girguis | 64/32 F |
| 3,906,747 | 9/1975 | Orain | 64/21 |

FOREIGN PATENT DOCUMENTS 2205798 4/1973 Fed. Rep. of Germany ........... 64/32 F Primary Examiner—Henry K. Artis
Attorney, Agent, or Firm—Toren, McGeady and Stanger

[57] ABSTRACT

In a sealing arrangement for the open space in a homokinetic universal joint formed of an outer joint member defining an interior hollow space and an inner joint member positioned within the hollow space, a sealing boot assembly includes a single part or plural part boot. The assembly includes a ring having a cylindrical inner surface mounted on the outer spherical surface of the outer joint member. When a two-part boot is used, one end of each part is fixed to the ring and the other end is secured to one of the driving or driven parts extending from the universal joint.

9 Claims, 3 Drawing Figures

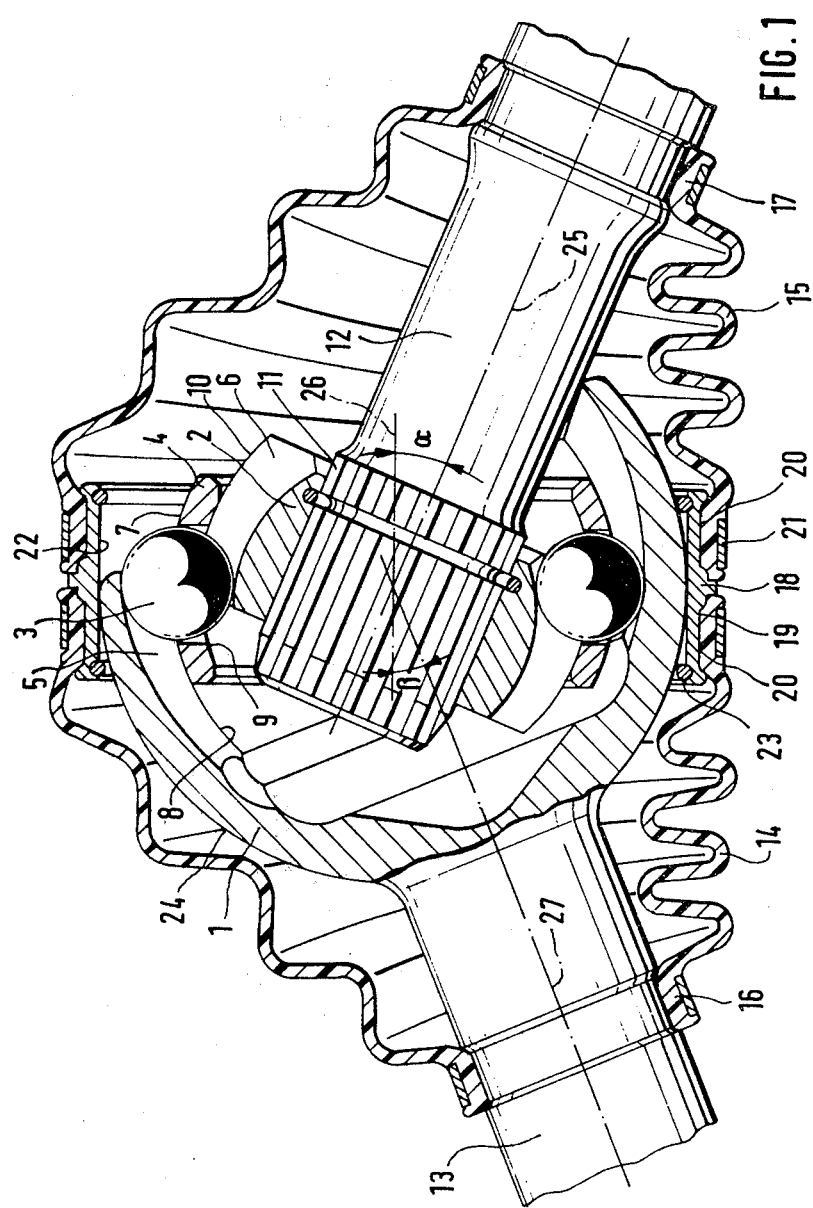

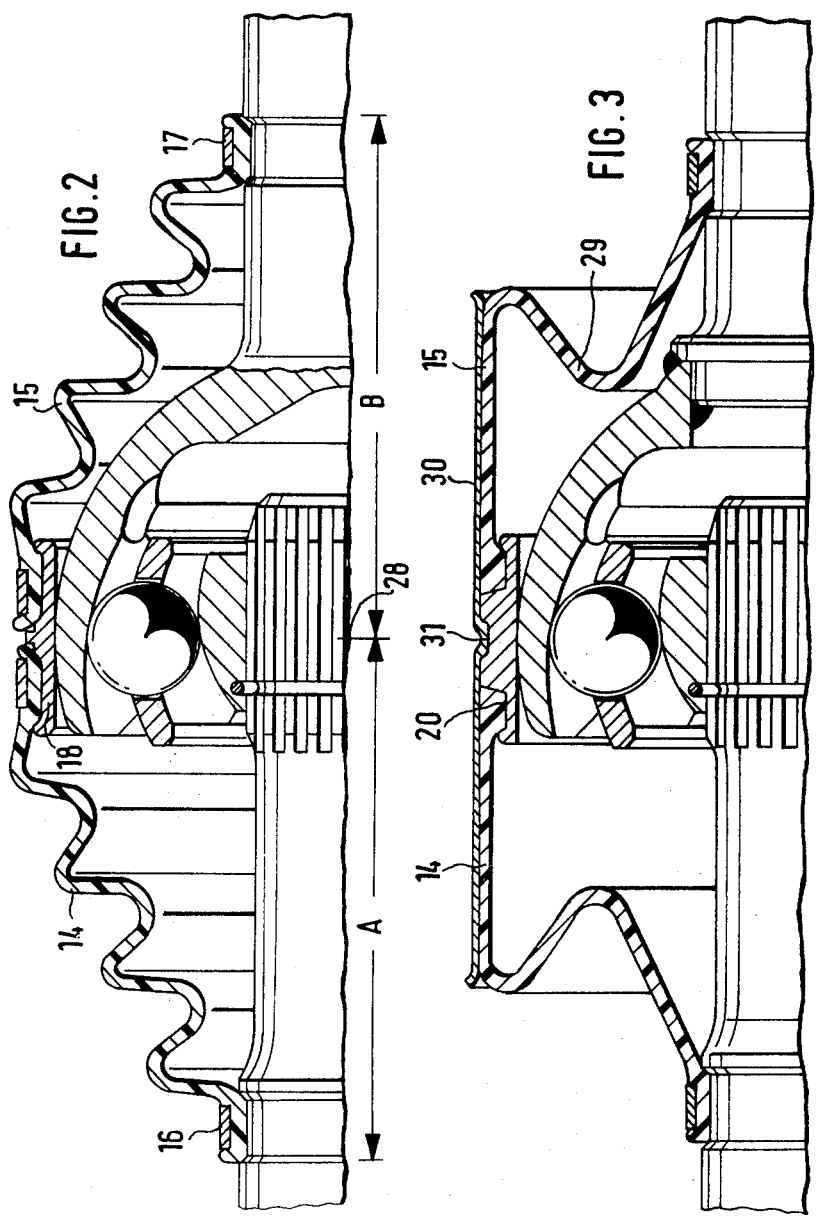

SEALING ARRANGEMENT FOR A UNIVERSAL JOINT

SUMMARY OF THE INVENTION

The present invention is directed to an arrangement for covering and sealing the open space between the driving and driven parts in a homokinetic universal joint in which rolling bodies provide the transmission of torque between an outer joint member and an inner joint member. Each of the outer and inner joint members have oppositely disposed grooves in which the rolling bodies are guided for half the bending angle. The arrangement includes a sealing boot assembly consisting of a single part or multiple part boot, with the part or parts being secured to the driving and driven parts spaced from the joint and also to a member encircling the joint.

In such an arrangement, the sealing boot extends over the open space within the universal joint extending between the driving part, such as an inner joint member, and the driven part, such as an outer joint member, so that there is relative movement between the sealing boot and the parts extending from the universal joint.

In a known sealing boot for enclosing a homokinetic universal joint, note German Auslegeschrift No. 2,205,798, a multi-part sealing boot is used and a fixing device secures the boot parts to a cage within the universal joint. By fixing the sealing boot parts to the cage, a division of the open space to be enclosed by the sealing boot is achieved, that is, there is an exact division of the bending angle and of the sliding path. Since the cage is positioned within the outer joint member where there is an intermediate fastening of the sealing boot parts to the cage, two parts are provided which extend asymmetrically relative to one another and are subject to different loads and conditions during operation, so that in such an arrangement it would be obvious to form each sealing boot part from a material having different properties.

In a homokinetic universal joint constructed as a rigid joint and which operates predominantly at the maximum bending angle, the use of the above sealing boot is hardly possible. In practice, it has been found that such sealing boots fail prematurely under the very great loads occurring at maximum deflection of the joint.

Another sealing arangement for a universal joint with a stationary bearing ring is disclosed in U.S. Pat. No. 2,331,982. In this sealing arrangement the sealing boot consists of two parts and each part extends from the joint to a shaft section extending from the joint. Accordingly, sealing boot parts can only be mounted either at the joint or at the shaft. Further, the part at the joint to which the sealing boot parts are fastened is not intended for movement in an angle-bisecting plane. As a result, a sealed closure of the joint is not provided and, further, the load is not distributed.

In view of the foregoing, it is the primary object of the present invention to reduce the load on the sealing boot, particularly in a rigid homokinetic universal joint whose predominant operational range is close to the maximum bending angle of the joint, and to increase the service life of the sealing boot. Furthermore, the bending angle of the sealing boot should also be smaller than the bending angle of the bent joint, so that the operational safety of the seling boot is not endangered by parts which rub together.

In accordance with the present invention, the sealing arrangement spans the entire homokinetic universal joint and the sealing boot parts are secured in annular grooves formed on the outer surface of a ring whose inner surface is guided on the outer surface of the outer joint member.

In the sealing arrangement embodying the present invention, there is the advantage that, because of the intermediate attachment of the sealing boot on the ring, the sealing boot only undergoes a portion of the bending angle of the joint. The ring is guided on the outer surface of the outer joint member and is guided by the sealing boot at an intermediate value which depends on the resistance value of the sealing boot and on the initial stress. Since the sealing boot assembly spans the entire joint, particularly advantageous conditions result on the side on which the shafts extending from the joints assume the smaller angle relative to one another, so that it is possible without any difficulty that the adjacent folds of the sealing boot do not rub together during operation and, as a result, are not damaged. Such damage could finally lead to a failure of the entire joint, since the lubricating effect would be lost immediately, particularly when oil is used as the lubricant.

In one embodiment of the present invention which is particularly advantageous for production reasons, the outer surface of the outer joint member is formed as a spherical surface and the inner surface of the ring is formed as a cylindrical surface.

Another essential feature of the present invention is the provision on the outer surface of the ring of two fastening grooves or locations for fixing the sealing boot to the ring.

In a particularly economical form of the sealing boot, it is formed from two similar sealing boot parts each of which is individually secured in the conventional manner on the outer surface of the ring.

Another feature is the provision of a safety element on the inner cylindrical surface of the ring adjacent each of its opposite ends. The inner diameter of the safety elements is smaller than the outer diameter of the outer surface of the outer joint member. If sealing boots are used made of materials of different qualities it should still be ensured that, even at unequal initial stress, that is with unequal resistance values of the material, the sealing boot parts are guided on half of the bending angle of the joint and by means of the safety elements it can be ensured that they move on a certain region of the outer joint member and are secured against axial movement by the safety elements.

To provide an exact guidance for half of the bending angle without the use of any safety elements in the ring, in accordance with another feature of the present invention, a two-part sealing boot is provided or if a one-part sealing boot is used, the two parts or two halves are constructed symmetrically so that they guide the ring over half the bending angle with equal initial stress. If the sealing boot parts or halves are formed with equal initial stress and with a uniform resistance value, it results that the ring guides the boot parts or halves over half the bending angle.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention .

BRIEF DESCRIPTION OF THE DRAWING

In the drawing:

FIG. 1 is a sectional view of a sealing boot assembly for a rigid homokinetic universal joint with a two-part sealing boot being used with the adjacent end of the boot parts mounted on a ring;

FIG. 2 is an axial view of a portion of a sealing boot assembly, similar to that shown in FIG. 1, however, in this assembly there are no safety elements for preventing axial movement of the ring; and FIG. 3 is an axial view of a portion of a sealing boot assembly, similar to that shown in FIGS. 1 and 2, however, with a sheet metal cover encircling and supporting the radially outer surfaces of the sealing boot parts.

DETAIL DESCRIPTION OF THE INVENTION

In FIG. 1 the homokinetic universal joint consists of an outer joint member 1 having an interior hollow space with an inner joint member 2 extending into the hollow space with its outer surface spaced inwardly from the inner surface of the outer joint member and with a cage 4 located between the inner and outer joint member and holding a number of balls 3. The outer joint member 1 has grooves 5 while the inner joint member has grooves 6 and each pair of opposed grooves receives one of the balls 3 for transmitting torque between the inner and outer joint members. Cage 4 has an outer spherical surface 7 guided on a corresponding spherical surface 8 defining the hollow space within the outer joint member 1. In addition, cage 4 has an inner spherical surface 9 guided on the outer spherical surface 10 of the inner joint member. The inner joint member is connected to an axially extending shaft 12 by a spline arrangement 11. An axial trunnion 13 is secured to and extends from the outer joint member 1 in the opposite direction to that of the shaft 12. The arrangement for sealing the homokinetic universal joint consists of a sealing boot assembly 40 incuding two sealing boot parts 14, 15. Sealing boot part 14 is secured on the axle trunnion 13 about a circumferentially extending fastening surface 16 and the other sealing boot part 15 is secured on the shaft 12 about a similar fastening surface 17. From these two fastening surfaces, the sealing boot parts extend toward one another to the universal joint with the ends of the boot parts at the joint being held against the outer surface of a ring 18 extending around the outer joint member 1. Ring 18 has two axially spaced circumferentially extending grooves 20 formed in its outer surface 19 and the thicker ends of the sealing boot parts 14 and 15 located at the joint are fixed into the grooves by metal bands 21.

Ring 18 has a cylindrically shaped inner surface 22 in juxtaposition to the spherically shaped outer surface of the outer joint member 1. Adjacent the opposite open ends of the ring 18, a safety element or ring 23 is provided which seats in a corresponding groove in the inner surface 22. These safety rings 23 each have an inner diameter, in the assembled position in the ring, smaller than the outside diameter of the spherical outer surface 24 of the outer joint member and this dimensional difference ensures that the ring undergoes only slight axial movements. The use of two sealing boots 14, 15 which are of the same construction and have the same resistance values as well as the same material qualities, ensures that the ring 18 assumes half the bending angle when the universal joint is bent, so that the angle α which is formed by the axis of rotation 25 of the shaft 12 and the axis 26 of the ring 18 is the same as the angle β which is formed by the axis of rotation 27 of the axile trunnion 13 and the axis 26 of the ring.

The embodiment shown in FIG. 2 is generally the same as that shown in FIG. 1, however, there is the difference that the safety rings 23 are unnecessary, since, due to the symmetry of the sealing boot parts 14, 15 whose resistance values and material qualities are the same, it is ensured that the ring 18 is guided for half the bending angle even without the safety rings. In this regard, it is significant that the distances A, B between the fastening surfaces 16, 17 and the center 28 of the joint are equal, so that all ratios between the two parts are equal and, therefore, the ring 18 can be fixed without any difficulty at half of the bending angle of the joint.

In FIG. 3, the same conditions as in FIGS. 1 and 2 exist. In this embodiment, the sealing boot parts 14, 15 are provided with grooves 29 which extend around the shafts so that the openings in the grooves face away from the universal joint. A sheet metal cover or sleeve 30 laterally encircles a portion of the outer surface of the boot parts so that centrifugal force can be absorbed during operation. Further, the sheet metal cover 30 fixes the thicker ends of the sealing boot parts 14, 15 in the grooves 20 formed in the outer surface of the ring 18 with the result that additional metal bands or the like are not necessary for securing the sealing boot parts on the ring. An annular groove 31 is provided on the outer surface of the ring 18 so that the sheet metal cover 30 can be rolled into the groove and held against axial movement.

While specific embodiments of the invention have been shown and described in detail to illustrate the application of the inventive principles, it will be understood that the invention may be embodied otherwise without departing from such principles.

What is claimed is:

1. Sealing arrangement for covering and sealing the open space in a homokinetic universal joint, said universal joint comprising a driving part, a driven part, and means for transmitting torque between said driving and driven parts, one of said driving part and said driven part including an outer joint member forming a hollow space therewithin, the outer surface of said outer joint member being spherically shaped, the other of said driving part and said driven part including an inner joint member extending into the hollow space in said outer joint member, said outer joint member having grooves formed in the inner surface thereof defining the hollow space and said inner joint member having grooves formed on the outer surface thereof disposed opposite the grooves in the inner surface of said outer joint member, and said means for transmitting torque comprises rolling bodies located within and extending between said grooves in said outer and inner joint members, a sealing boot assembly laterally enclosing said universal joint and extending in the axial directions of and between said driving part and said driven part, said sealing boot assembly includes a sealing boot, means for fixing said sealing boot to said driving part and said driven part at locations spaced axially from said inner and outer joint members, wherein the improvement comprises that said sealing boot assembly spans said universal joint from said driving part to said driven part and includes a ring separate from and extending circumferentially around the outer spherical surface of said outer joint member with the inner surface of said ring being cylindrically shaped and in surface contact with and guided on the outer surface of said outer joint member so that the outer surface of said outer joint member is slidably movable relative to the inner surface of said ring, and said sealing boot being secured to the outer surface of said ring so that the axial extending parts thereof between said ring and said driving point and driven part being free.

2. Sealing arrangement, as set forth in claim 1, wherein said sealing boot includes a first sealing boot part extending between said driving part and said ring and a second sealing boot part separate from said first sealing boot part extending between said driven part and said ring, the outer surface of said ring has a pair of circumferentially extending attachment surfaces spaced apart in the axial direction of said ring with one of said attachment surfaces arranged to have the end of said first sealing boot part fixed thereon and the other of said attachment surfaces arranged to have the end of said second sealing boot part fixed thereon.

3. Sealing arrangement, as set forth in claim 1, wherein said ring has a pair of opposite open ends spaced apart in the axial direction of said ring, a ring-shaped safety element is provided adjacent each of the open ends of said ring and is placed within said ring in contact with the inner surface thereof, each said safety element having an inner diameter smaller than the diameter of the spherically shaped outer surface of said outer joint member.

4. Sealing arrangement, as set forth in claim 1, wherein said sealing boot includes a first sealing boot part extending between said driving part and said ring and a separate second sealing boot part extending between said driven part and said ring, said first and second sealing boot parts are of the same length and are symmetrically constructed.

5. Sealing arrangement, as set forth in claim 1, wherein said sealing boot assembly includes means extending circumferentially around the ends of said sealing boot for securing said sealing boot to said driving and driven parts and around said sealing boot in the range of said ring for securing said sealing boot to said ring.

6. Sealing arrangement, as set forth in claim 2, wherein each of said attachment surfaces on said ring comprises an annular groove extending circumferentially around said ring.

7. Sealing arrangement, as set forth in claim 1, wherein said sealing boot includes a first sealing boot part extending between said driving part and said ring and a second sealing boot part extending between said driven part and said ring, said first and second sealing boot parts are of the same length and construction, said sealing boot assembly includes an axially extending tubular shaped cover encircling the outer surface of said ring and extending axially outwardly from each opposite end of said ring, said first and second sealing boot parts each having an end fixed to said ring with the inner surface of said cover bearing against the outwardly facing surfaces of said first and second sealing boot parts at the ends fixed to said ring.

8. Sealing arrangement, as set forth in claim 7, wherein the outer surface of each of said first and second sealing boot parts is in contacting engagement with said cover from the end in contact with said ring to approximately the adjacent end of said cover.

9. Sealing arrangement, as set forth in claim 8, wherein each said sealing boot part has a portion located radially inwardly of said cover forming an annular groove with the opening into the groove facing in the axial direction of said cover away from said universal joint.

* * * * *